United States Patent [19]

Ridley et al.

[11] Patent Number: 4,866,367
[45] Date of Patent: Sep. 12, 1989

[54] MULTI-LOOP CONTROL FOR QUASI-RESONANT CONVERTERS

[75] Inventors: Raymond B. Ridley; Fred C. Lee, both of Blacksburg, Va.

[73] Assignee: Virginia Tech Intellectual Properties, Inc., Blacksburg, Va.

[21] Appl. No.: 179,927

[22] Filed: Apr. 11, 1988

[51] Int. Cl.$^4$ .................................... H02M 3/156
[52] U.S. Cl. ................. 323/287; 323/290; 363/21
[58] Field of Search ............... 363/21; 323/285, 286, 323/287, 271, 290, 282, 222

[56] References Cited

U.S. PATENT DOCUMENTS

| | | | |
|---|---|---|---|
| 3,663,949 | 5/1972 | Froeschle | 323/287 |
| 4,013,939 | 3/1977 | Biess | 323/286 |
| 4,258,308 | 3/1981 | Weischedel | 323/285 |
| 4,694,240 | 9/1987 | Grunsch | 323/285 |
| 4,709,316 | 11/1987 | Ngo | 363/21 |

FOREIGN PATENT DOCUMENTS 2823437 12/1979 Fed. Rep. of Germany ...... 323/286

Primary Examiner—William H. Beha, Jr.
Attorney, Agent, or Firm—Mason, Fenwick & Lawrence

[57] ABSTRACT

A multi-loop controller for controlling a quasi-resonant converter having a power switch, a filter inductor and an output voltage. The controller includes a sensor circuit for sensing the output voltage of the converter. A detector monitors the filter inductor current of the converter. The output voltage is compared with a known reference voltage to develop a control error voltage when the output voltage exceeds the reference voltage. A comparing circuit then compares the inductor current with the control error voltage and produces a control signal when a predetermination relationship has been detected. Finally, an activating circuit responsive to the control signal turns the power switch on.

5 Claims, 7 Drawing Sheets

MULTI-LOOP CONTROL FOR QUASI-RESONANT CONVERTERS

FIELD OF THE INVENTION

The present invention relates to control of converters, in general, and to multi-loop control of quasi-resonant converters, in particular.

BACKGROUND OF THE INVENTION

New technologies in power conversion have allowed switching frequencies to increase from around 100 kHz to above 20 MHz. See, for example, "Resonant Switches: A Unified Approach To Improving Performances Of Switching Converters", by K. Liu and F. C. Lee, INTELEC 84, IEEE Publication 84 CH 2073-5, pp. 344-359. Also see, "Resonant Switches - Topologies And Characteristics", by K. Liu et al, IEEE PESC Record, pp. 106-116 (1985). Several practical converters have been described with switching frequencies up to 22 MHz. See, for example, the following articles.

"Zero-Voltage-Switched Quasi-Resonant Buck And Flyback Converts - Experimental Results At 10 MHz", W. A. Tabisz, P. Gradzki and F. C. Lee, IEEE Power Electronic Specialists Conference, Blacksburg, Va., pp. 404-413 (June 21-26, 1987).

"Zero-Voltage-Switching Technique In High-Frequency Off-Line Converters", M. M. Jovanovic, W. A. Tabisz and F. C. Lee, Applied Power Electronics Conference Proceedings, New Orleans, La. (February 1988).

"A Resonant DC-To-DC Converter Operating At 22 MHz", Applied Power Electronics Conference Proceedings, New Orleans, La. (February 1988).

U.S. Pat. No. 4,720,667 (Lee et al) relates to zero-current-switched quasi-resonant converters, whereas U.S. Pat. No. 4,720,668 (Lee et al) relates to zero-voltage-switched quasi-resonant converters. At the same time, there are several co-pending applications of interest. In particular, U.S. patent application Ser. No. 856,775 (Lee et al) now U.S. Pat. No. 4,785,387 relates to resonant converters with secondary side resonance; U.S. patent application Ser. No. 99,965 (Tabisz et al) relates to DC-to-DC converters using multi-resonant switches; U.S. patent application Ser. No. 99,952 (Jovanovic et al) relates to off-line zero-voltage-switched quasi-resonant converters; and U.S. patent application filed on even date herewith and entitled "Zero-Voltage-Switched Multi-Resonant Converters Including The Buck And Forward Type" relates to buck and forward multi-resonant converters.

It has been demonstrated that good efficiency can be achieved at these high switching frequencies and considerable size reduction can be expected. However, the full benefits of higher switching frequency cannot be realized unless a high bandwidth, rugged control is used.

Closed-loop regulation of the output voltage of a quasi-resonant converter can be achieved by feedback of the output voltage. Analysis of each of the quasi-resonant power stages shows their small signal characteristics to be similar to their pulse-width-modulated (PWM) counterparts. A compensation network can, therefore, be designed in a similar manner to PWM converter compensation to meet the requirements of closed-loop performance.

A commonly used, single-loop control scheme for a buck quasi-resonant converter (QRC) power stage employs a two-pole, two-zero compensation network to provide high low-frequency gain and improved phase margin at the cross-over frequency. The output filter capacitor suitable for filtering the high switching frequency waveforms of a QRC usually has a very low equivalent series resistance (ESR). The zero due to this ESR usually occurs above the switching frequency and does not improve the phase margin.

In single-loop control, the system includes an error amplifier in which the output is fed to a voltage-controlled oscillator (VCO). Switch drive circuitry for controlling the converter switch is driven by the output of the VCO. In this way, the output of the error amplifier controls the VCO. The switch drive circuitry converts the output signal of the VCO into a constant on-time pulse.

This single-loop control has several disadvantages:

The VCO requires a considerable number of components.

The effective bandwidth of the control is limited by noises considerations: a VCO can be sensitive at higher frequencies; and a large amount of ripple is transmitted through a high-gain amplifier.

The undamped buck QRC and the boost and buck boost QRCs can be very difficult to compensate. Bandwidth and good closed-loop performance must be traded off against stability.

Boost and buck boost converters are especially difficult to control since they have a right-half plane zero in the control-to-output transfer function. This zero places severe limitations on the bandwidth of the control loop and, therefore, good closed-loop performance is difficult to achieve.

The control loop for the single-loop system is quite difficult to design due to an undamped output filter. To achieve transient responses comparable to those with current-sense frequency control (CSFC)control, the system has to be designed close to instability. This explains the oscillatory nature of the transient responses. Single-loop control is quite sensitive to input and parameter variations and becomes unstable at different operating points.

There is thus a need for a control scheme for high-frequency quasi-resonant converters that provides a rugged system with excellent transient response and noise immunity. The present invention is directed toward filling that need.

SUMMARY OF THE INVENTION

The present invention is directed to a multi-loop control for use with zero-current-switched or zero-voltage-switched quasi-resonant converters. The multi-loop control overcomes many of the drawbacks associated with single-loop control.

The several embodiments of the present invention offer all of the small signal benefits expected from current-mode control. The control-to-input, audio susceptibility and output impedance transfer functions all have a first order characteristic at frequencies below the cross-over of the current loop. The voltage compensation is, therefore, much simpler to design and optimize for a desired closed-loop performance and the system is quite insensitive to parameter variations. In several embodiments of the present invention a multi-loop control scheme is employed which has all of the desirable features of current-mode control for PWM converters.

One preferred embodiment is applied to 1 MHz zero-current-switched quasi-resonant converters.

Another preferred embodiment of the present invention is able to overcome the limitations of the operational amplifier used to provide the current-sensing feedback. This preferred embodiment is able to control zero-voltage-switched (ZVS) QRCs at frequencies from 2 to 10 MHz.

In still another embodiment, the invention is incorporated into a multi-loop control for a 7 MHz ZVS buck QRC. This embodiment demonstrates the simplicity and low parts count of the inventive control circuit. Circuit waveforms for this converter show the clean control signals obtained at high switching frequencies. Bode plots of the loop gain of the system confirm theoretical predictions of small signal performance and show the very high cross-over frequency achieved.

For QRCs, multi-loop control can be generally implemented in several ways to solve the problems of the prior art.

In one embodiment, applied to a zero-current-switched buck quasi-resonant converter, a continuous output filter-inductor current is sensed directly. The ramp of the inductor current is used to generate the controlling waveform and is compared to the error voltage from an operational amplifier to control the switching frequency of a converter on a cycle-by-cycle basis. With this control, the ramp generated by the filter-inductor current replaces the voltage-controlled ramp generator required with a VCO.

For ZCS-QRCs, the current must be sensed during the off-time of the switch so the current transformer is placed in series with the diode. For ZVS-QRCs, the current must be sensed during the on-time of the switch so the transformer must be placed in series with the switch. Like PWM circuits, the waveform of the current-sense circuit is noisy. The signal has a large step amplitude and a small ramp and oscillations in the signal make it very difficult to use for control above 500 kHz.

In another embodiment of multi-loop control, the inductor voltage is sensed and integrated to reconstruct the inverted AC portion of the inductor current. This is summed through an operational amplifier with the error voltage and compared to a fixed reference. The circuit is inherently noise-free due to the integration of all control waveforms and is the only practical way to implement multi-loop control at high frequencies.

Good small signal characteristics are obtained with certain embodiments of the multi-loop control circuit. The bandwidth of the loop gain is limited only by the choice of operational amplifier, not by the power stage or any delays in the control circuit. With this control scheme, it is possible to push the loop-gain cross-over frequency beyond 1 MHz for a 5 to 10 MHz converter. This increase in crossover can dramatically affect the size of the power stage components, especially the output filter capacitor.

It is thus a principal object of the present invention to provide a control that is capable of efficiently operating quasi-resonant converters at high switching frequencies.

It is another object of the present invention to provide a multi-loop control scheme for quasi-resonant converters having the desirable features of current mode control.

It is still another object of the present invention to provide a multi-loop control that eliminates the need for a voltage-controlled oscillator in the control circuit.

It is yet another object of the present invention to provide a multi-loop control that can be used to control zero-voltage-switched quasi-resonant converters at frequencies up to 10 MHz.

These and other objects and advantages will become apparent when the present invention is considered in light of the following detailed description with reference to the following drawings.

BRIEF DESCRIPTION OF THE DRAWINGS

FIG. 4a shows direct inductor current sensing. FIG. 4b shows diode current sensing. FIG. 4c shows AC current sensing.

DETAILED DESCRIPTION OF THE PREFERRED EMBODIMENTS

Figure 1:
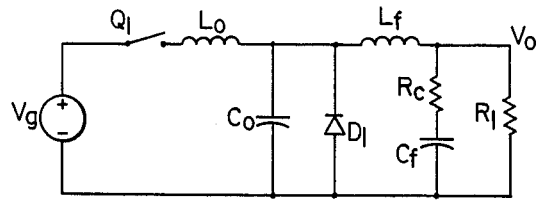
FIG. 1 is a schematic diagram of a quasi-resonant buck converter power stage.

In describing the preferred embodiments of the subject invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Quasi-resonant converters (QRCs) eliminate most of the switching stress encountered in pulse-width-modulation (PWM) converters since the active device is switched with either zero-current or zero-voltage at its terminals. This allows for circuit operation at much higher frequencies (above one MHz) and a significant decrease in converter component size. Many different QRC topologies have been presented and their power circuit operation analyzed.

QRCs are controlled by varying the switching frequency. Closed-loop regulation is most commonly achieved by feedback of the output voltage through an error-amplifier circuit and a voltage-controlled oscillator (VCO). This is analogous to conventional duty-cycle modulation of a single-loop-controlled PWM converter with a constant on-time control where the duty cycle is changed by modulation of the switching frequency.

Small signal analysis of QRCs shows that they have similar characteristics to their PWM converter counterparts. It can, therefore, be quite difficult to achieve satisfactory closed-loop response with single-loop control, especially for boost and buck-boost derived circuits with right-half-plane zeros in their control-to-output transfer functions.

Current mode control offers significant improvement in closed-loop response for the control of QRCs. Referred to as current-sense frequency control(CSFC), this control compares a signal proportional to the output filter-inductor current with an error voltage signal to modulate the switching frequency.

Before describing the new control scheme, the power stage operation of a zero-current-switched quasi-resonant buck converter (buck ZCS-QRC) is reviewed. FIG. 1 shows the circuit diagram of this converter.

The various circuit elements for the circuit of FIG. 1 are as follows:

| | | |
|---|---|---|
| $L_o$ = 30 nH | $C_o$ = 0.3 $\mu$F | $L_f$ = 5.7 $\mu$H |
| $C_f$ = 63 $\mu$F | $R_c$ = 10 m$\Omega$ | $R_L$ = 0.5 $\Omega$ |
| $V_g$ = 12 V | $V_o$ = 5 V | $F_s$ = 400 kHz |

The output stage of the circuit, formed by inductor $L_f$, capacitor $C_f$ and resistors $R_c$ and $R_L$, is essentially the same as a PWM buck converter. The simple switching cell of the buck converter, however, is replaced by a resonant switch formed by transistor $Q_1$, inductor $L_O$, capacitor $C_O$ and diode $D_1$. If switch $Q_1$ is bi-directional, the circuit is operated in full-wave mode; otherwise, the circuit is operated in half-wave mode.

Operation of the circuit is best understood by considering each linear circuit formed during a complete cycle of operation. The topologies formed by the different switch conditions and the circuit conditions of each topology are shown in FIGS. 2a through 2d.

Figure 2A:
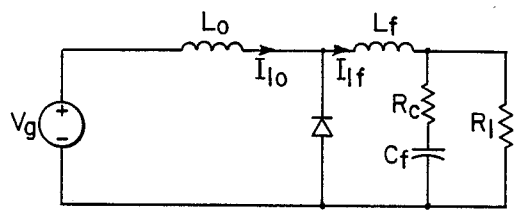
FIGS. 2a through 2d are schematic diagrams showing the topological modes of the quasi-resonant buck converter of FIG. 1 during continuous current operation.
Figure 2B:
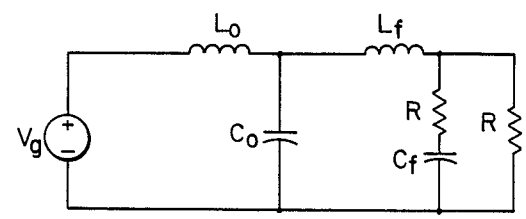
Figure 2C:
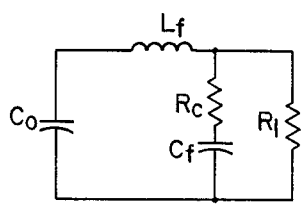
Figure 2D:
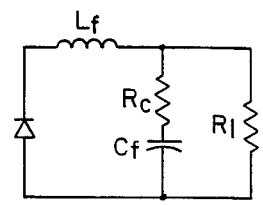

Each mode is entered sequentially and ensures continuous current of the output filter-inductor. During topology I (FIG. 2a), with $I_{LO} < I_{Lf}$, both the power switch $Q_1$ and diode $D_1$ are conducting and the resonant inductor $I_{LO}$ current increases linearly until it equals the filter-inductor current $I_{Lf}$. The diode then turns off and the resonant cycle of the circuit is entered during topology II (FIG. 2b) with $I_{LO} > 0$. For half-wave operation, the power switch is turned off when the resonant inductor current reaches zero and the resonant capacitor $C_O$ discharges into the load filter in topology III (FIG. 2c) where $V_{CO} > 0$ (FIG. 2d). The final topology is entered when the resonant capacitor voltage falls to zero and the diode again conducts. Control of the circuit is achieved by regulating the time the circuit stays in topology IV.

The inductor current waveform of the output filter is similar to that of a PWM converter. During topology IV, when the control must be implemented, the inductor current decreases linearly. The output voltage waveform has a low ripple (19 mV p—p) achieved by using small filter components.

Closed-loop regulation of the output voltage of the QRC can be achieved by feedback of the output voltage $V_O$. Analysis of each of the quasi-resonant power stages shows their small signal characteristics are similar to comparable PWM converters. A compensation network can, therefore, be designed in a similar manner to PWM converter compensation to meet the closed-loop performance specifications.

Figure 3:
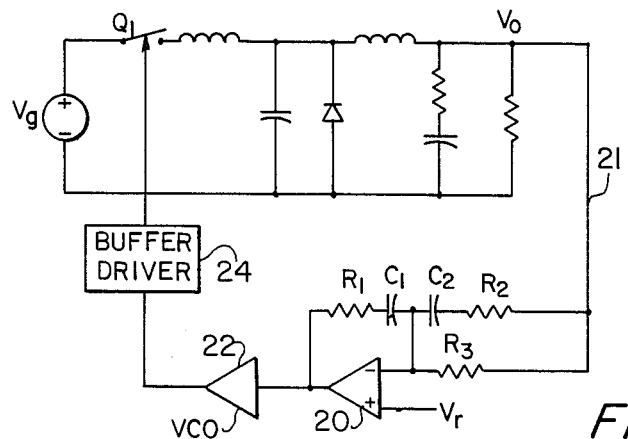
FIG. 3 is a schematic diagram showing a single-loop-controlled quasi-resonant converter with a voltage-controlled oscillator.

A commonly used, single-loop control scheme for the buck QRC power stage described earlier is shown in FIG. 3. The control also employs a voltage-controlled oscillator (VCO) 22. In the embodiment of FIG. 3, the components in the control have the following values:

| | | |
|---|---|---|
| $C_1$ = 800 pF | $C_2$ = 630 pF | $R_1$ = 10 k$\Omega$ |
| $R_2$ = 1.0 k$\Omega$ | $R_3$ = 3.1 k$\Omega$ | VCO Gain = 0.32 MHz/V |

A two-pole, two-zero compensation network is used for this circuit to provide high low-frequency gain and improved phase margin at the cross-over frequency. The output filter capacitor suitable for filtering the high switching-frequency waveforms of a QRC usually has a very low equivalent series resistance (ESR). The zero due to this ESR usually occurs above the switching frequency and does not improve the phase margin.

Basically, the single-loop control includes an operational amplifier 20 receiving a reference voltage $V_r$ at its positive input. The negative input is connected to a parallel arrangement of resistor $R_3$ and capacitor $C_2$ in series with resistor $R_2$. The other end of this arrangement receives the output voltage $V_O$ from the converter on line 21. A capacitor $C_1$, in series with resistor $R_1$, is connected between the negative input and output of op-amp 20. The output of op-amp 20 is fed to VCO 22 and then to a buffer 24 for driving the power switch $Q_1$ of the converter.

Figure 5A:
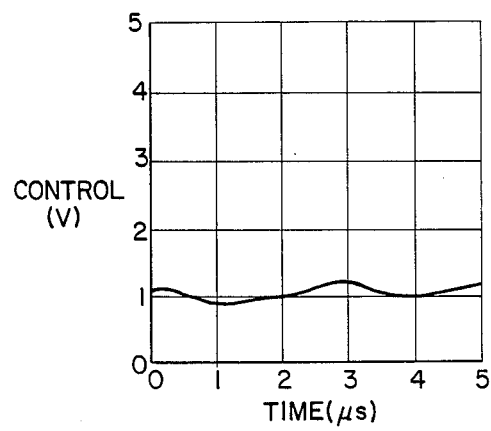
FIG. 5a is a steady-state control waveform showing single-loop control error voltage.
Figure 5B:
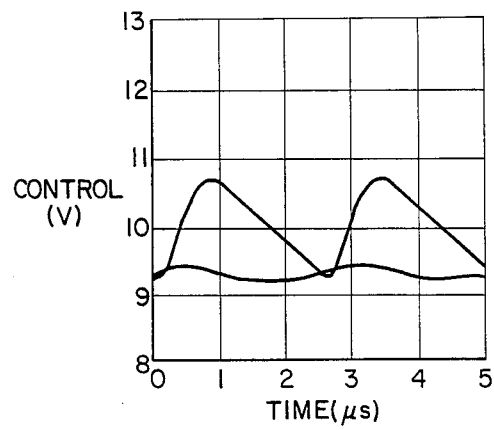
FIG. 5b is a steady-state control waveform showing CSFC with direct current sensing.

The output of the error amplifier 20 controls the VCO 22 determining the time the circuit stays in topology IV. Buffer 24 consists of switch drive circuitry for converting the output signal of the VCO into a constant on-time pulse. A suitable buffer driver is made by National Semiconductor under product number DS0026. The signal at the output of the error amplifier is shown in FIG. 5a.

This single-loop control has several disadvantages:

The VCO requires a considerable number of components.

The effective bandwidth of the control is limited by noise considerations: A VCO can be sensitive at higher frequencies; and, a large amount of ripple is transmitted through a high-gain amplifier.

The undamped buck QRC and the boost and buck-boost QRCs can be very difficult to compensate. Bandwidth and good closed-loop performance must be traded off against stability.

Boost and buck-boost converters are especially difficult to control since they have a right-half-plane zero in the control-to-output transfer function. This zero places sever limitations on the bandwidth of the control loop and, therefore, good closed-loop performance is difficult to achieve.

Multi-loop control (or current-mode control) is effective for controlling quasi-resonant converters. CSFC offers the additional benefits of eliminating the VCO and increased noise immunity for certain implementations. Three embodiments of multi-loop control are shown in FIGS. 4a through 4c.

Figure 4A:
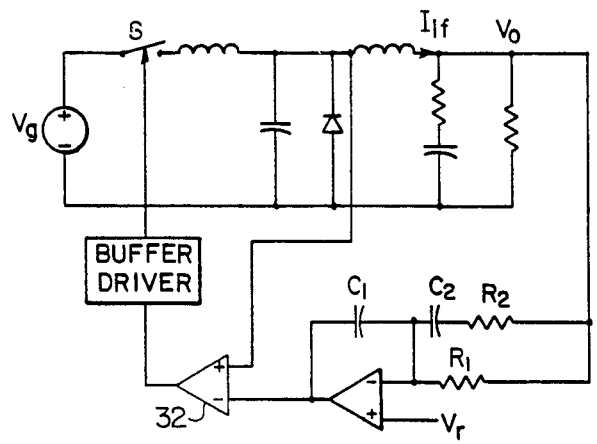
FIGS. 4a through 4c are schematic diagrams showing embodiments of multi-loop-controlled quasi-resonant converters incorporating the teachings of the present invention.
Figure 4B:
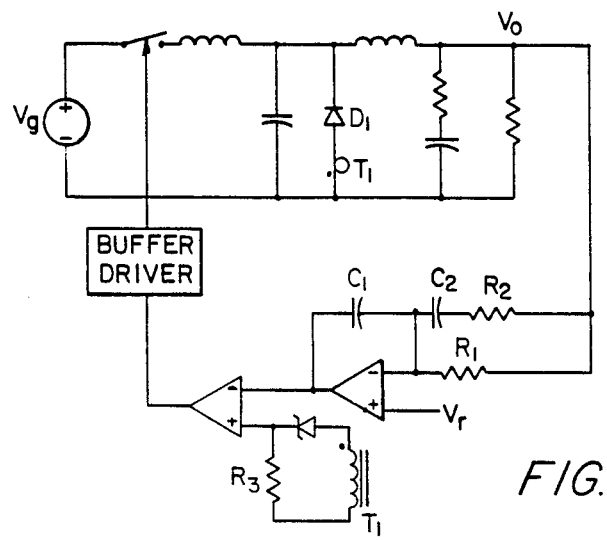
Figure 4C:
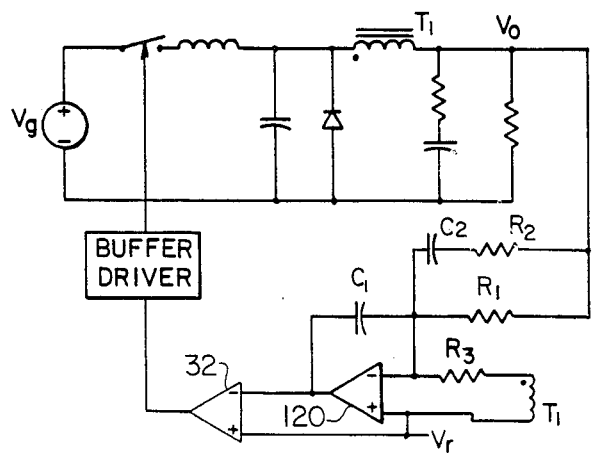

In the preferred embodiments of the multi-loop control systems of FIGS. 4a through 4c, the components have the following values:

| $C_1 = 200$ pF | $C_2 = 6300$ pF | $R_1 = 3.1$ k$\Omega$ |
|---|---|---|
| $R_2 = 100$ $\Omega$ | $V_r = 5.0$ V | |

Current-sense Gain = 1

FIG. 4a shows the basic concept for implementation of CSFC quasi-resonant converters, in general, and to a buck QRC, in particular. The continuous filter-inductor current $I_{Lf}$ is sensed directly. In topology IV (FIG. 2d), when the down-slope of this current intersects the control error voltage, the power switch S is turned on. The control waveforms for this implementation of CSFC are shown in FIG. 5i b. Using this multi-loop control, the circuit can be stabilized with a single-zero, two-pole compensation network. The function of the VCO is replaced with a simple comparator 32 whose operation is far less noise sensitive.

Like current-mode control for PWM converters, several possible ways of implementing CSFC exist. The most direct method uses resistive sensing with an operational amplifier, but this can be expensive for higher power outputs.

Figure 5C:
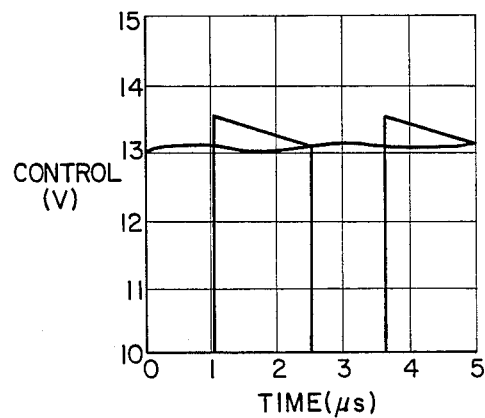
FIG. 5c is a steady-stage control waveform showing CSFC with diode current sensing.

A second preferred embodiment of the present invention uses a-current transformer $T_1$ in series with diode $D_1$, as shown in FIG. 4b. A current transformer $T_1$ can be used since the diode current is discontinuous and equal to the filter-inductor current during topology IV. The control waveforms for this circuit are shown in FIG. 5c. This control implementation can be used for current sharing and current limiting, but it may be difficult to implement due to the high-amplitude step waveforms which generate considerable noise. This problem is commonly experienced with PWM converters with current-transformer sensing and is worse for high-frequency operation of QRCs.

Figure 5D:
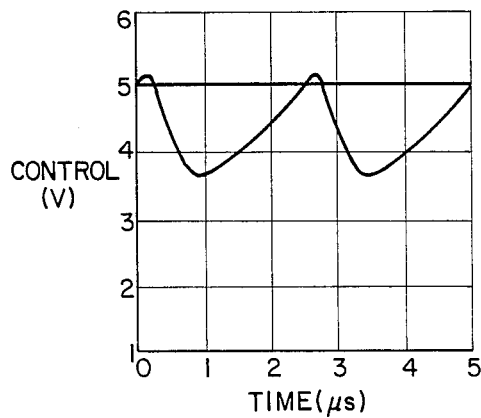
FIG. 5d is a steady-state control waveform showing CSFC with AC current sensing.

If current-limiting and current-sharing are not required, a simple and effective implementation of CSFC can be achieved by the embodiment shown in FIG. 4c. Here, the inductor voltage is sensed and integrated through resistor $R_3$ and capacitor $C_1$ to reconstruct the inverted AC portion of the inductor current $I_{Lf}$. This is summed through the operational amplifier 120 with the error voltage and compared to a fixed reference $V_r$. The control waveforms for this circuit are shown in FIG. 5d. The circuit is inherently noise-free due to the integration of all control waveforms and, therefore, is very useful for zero-voltage-switched converters operating at frequencies around 10 MHz.

Ignoring second-order effects, all three embodiments of CSFC as shown in FIGS. 4a through 4c offer substantially identical small signal characteristics for the circuit. The particular implementation of CSFC does not, therefore, affect the transient response of the circuit.

Figure 6:
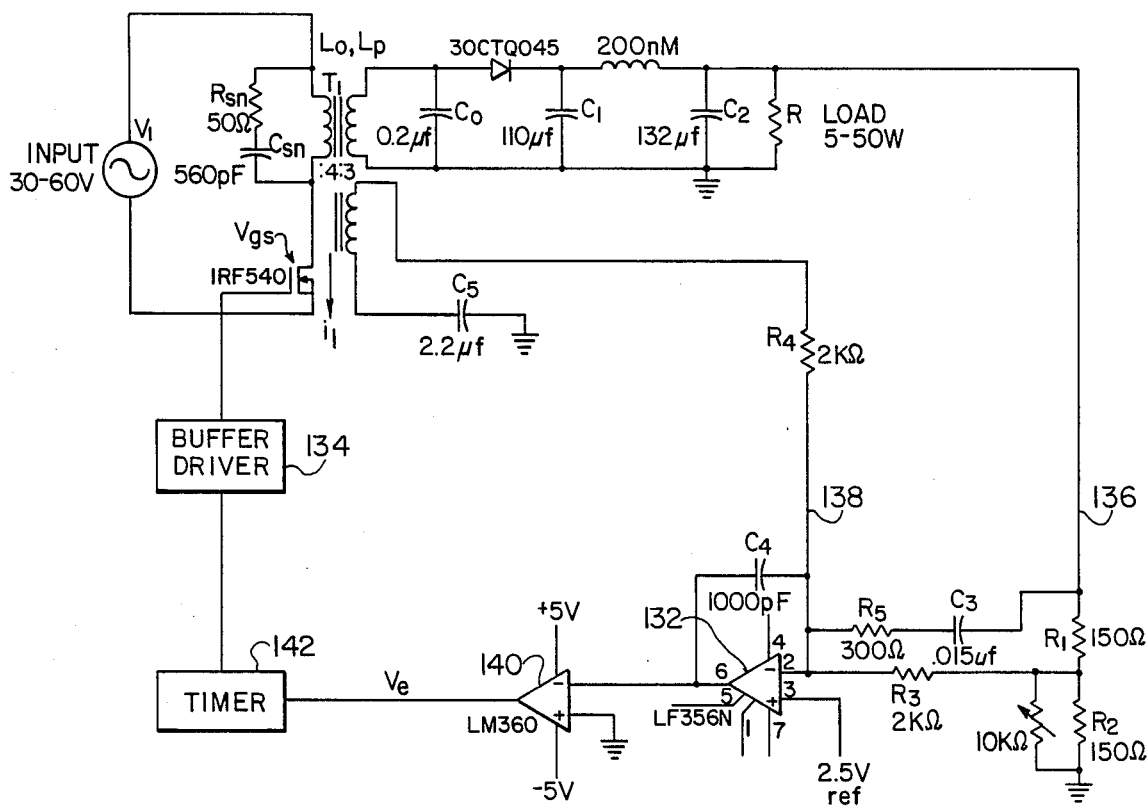
FIG. 6 is a schematic diagram of a 1 MHz multi-loop-controlled flyback quasi-resonant converter incorporating the teachings of the present invention.

FIG. 6 shows the complete circuit diagram of a flyback ZCS-QRC with multi-loop control. The first step in the design process is the selection of the resonant tank elements, $L_O$ and $C_O$. The resonant tank elements for a minimum stress design can be selected based upon the power converter specification. The first step in the resonant tank design is the selection of the resonant frequency $F_O$ of the tank circuit. This can be found from the maximum conversion ratio and the required maximum switching frequency $F_S$.

$$\frac{F_s}{F_o} = \frac{M_{max}}{1 + M_{max}} \simeq \frac{1}{2}$$

For a maximum switching frequency of 1 MHz, the resonant frequency is 2 MHz. The resonant inductor can be found from:

$$Z_o = \frac{R_{min}}{M_{max}} = \omega_o L_o$$

Hence, the resonant inductor, referred to the secondary is 47 nH. (With a turns ratio of 5:1, this corresponds to a primary leakage inductance value of 1.17 $\mu$H.) To obtain the desired resonant frequency of 2 MHz, the value of the resonant capacitor $C_O$ is 0.14 $\mu$F. With the values of $L_O$ and $C_O$ selected, the resonant tank design is complete.

The resonant inductor was formed by the leakage inductance of the power transformer $T_1$. The resonant capacitor was formed by four parallel metal film capacitors, each with a capacitance of $0.033$ $\mu$F and with a combined ESR of $_{10}$ m$\Omega$.

The next stage of the design process is the selection of the components $L_f$, $C_1$, $L_S$ and $C_2$. A two-stage LC filter was used on the output to meet the ripple requirements of 50 mV with small filter components.

Since the resonant inductor $L_O$ is known, the following equation gives the value of $L_f$ directly:

$$L_f = 23.6\ L_0 = 1.1\ \mu H$$

Capacitor $C_1$ carries a large RMS current, approximately equal to the load current under worst case conditions. Eleven 10 $\mu$F tantalum capacitors with a combined ESR of 20 m$\Omega$ were used for this capacitor.

With only the first stage of the filter, the output voltage ripple was about 0.2 V. A second stage LC filter was designed to attenuate this to meet the design specification of 50 mV. A 200 nH inductor, formed by a small MPP core with two turns, was used for $L_s$ and six 22 $\mu$F tantalum capacitors with a combined ESR of 30 m$\Omega$ were used for $C_2$.

The resonant inductor, filter inductor and transformer were constructed with a single magnetic element. A low profile core (TDK LP 22/8 H7C4) was used with a primary of 22 Litz wire and three secondary turns of 5 mil copper foil. Only 14 turns of the Litz wire could be fitted in the bobbin in a single layer, so the turns ratio was modified from 5:1 to 14:3 (4.67:1). With this new turns ratio, the required value of the primary leakage was 1 μH, and the magnetizing inductance, referred to the primary was 25.5 μH.

With non-interleaved windings, the minimum leakage inductance which can be obtained with this core and winding arrangement was calculated to be 400 nH. Spacers were added between the windings to increase the leakage to the required value of 1 μH. A 1 MHz, the short circuit impedance measurement of the primary of the completed transformer was 6.2Ω with a phase of 90°, corresponding to a leakage inductance of 1 μH.

The magnetizing inductance for the output filter was obtained by gaping the core. With this design, the maximum flux in the core was 0.3 T, but the flux excursion on each cycle was only 30 mT. The transformer core was thereby fully utilized with very small hysteresis losses. For the open-circuit impedance measurement of the primary of the transformer, the magnetizing inductance was 25 μH and the resonant frequency was at 20 MHz; well beyond the frequency of operation of the converter.

A form of current-mode control can be used for QRCs. For this converter, a secondary winding was added to the transformer to sense the inductor voltage. This was integrated through a operational amplifier (National Semiconductor LF 356) to provide feedback of the inductor current.

FIG. 6 shows the complete control circuit for the flyback converter. The error signal on line 136 summed with the inductor-current ramp on line 138 for different operating conditions show that when the up slope of this control ramp intersects a fixed threshold, the switch is turned on. As the input voltage is increased, the ramp increases and the switching frequency is decreased.

With this current feedback path completed, the control characteristic is now from a control voltage to the output voltage of the power supply.

The first step in the choice of components is the selection of the values of $n_S$, $R_4$ and $C_4$ for the current-loop feedback. These components can be chosen based upon large signal requirements only and small signal performance does not have to be considered. The capacitor $C_5$ is a DC blocking capacitor and its value is not critical. A μF tantalum capacitor was used here.

The ratio of sense turns to primary turns $n_S$ was chosen arbitrarily to be equal to 3:14, the same as the ratio of transformer secondary to primary turns. The operational amplifier feedback capacitor $C_4$ was chosen to be 1000 pF. A larger value than this would require too much drive from the operational amplifier 132 and a smaller value would be too close to the internal value of feedback capacitor $C_4$.

The integrating sense resistor $R_4$ is selected to provide a large control ramp amplitude $V_P$ at the output of the amplifier. This ramp must be large enough to prevent noise from triggering the control, but should not require too great a slew rate from the amplifier. Selecting a value of 1 V for the ramp, the resistor $R_4$ can be found from:

$$R_4 C_4 = \frac{n_S V_I}{V_P F_o}$$

Designing for the desired ramp at low-line, the value of the resistor is about 3 k. At 30 V input, the desired control ramp of 1 V is achieved. AT 60 V, the peak value of the control ramp is 2 V. This signal provides a very clean control system with no noise problems.

Figure 17:
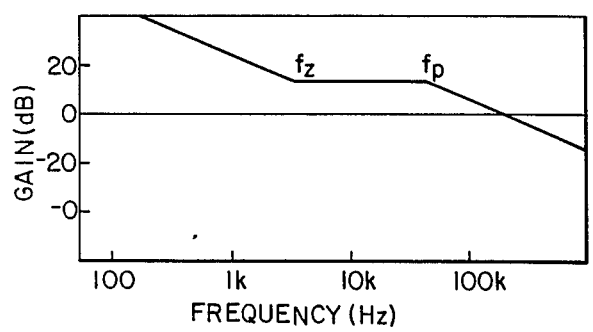
FIG. 17 is a graph showing the error amplifier compensation asymptotes for the flyback converter of FIG. 6.

With the current-loop closed, the components for the output voltage feedback were selected to give the desired transfer function shown in FIG. 17. The flat gain portion of this curve is given by the ratio of the two capacitors $C_3$ and $C_4$. To give the desired cross-over frequency of about 14 kHz, a value of 0.015 μF was used for $C_3$.

The pole $f_P$ of the transfer function of FIG. 17 is given by the corner frequency formed by $C_3$ and $R_5$. A value of 300Ω was used to put this pole at 40 kHz.

The DC path through resistors $R_1$, $R_2$ and $R_3$ provide a divider to give the desired output voltage of 5.1 V and a low-frequency integration to give low DC error. Resistor $R_1$ was chosen to be 150Ω and a 150Ω resistor in parallel with a 10 k potentiometer was used for $R_2$. The value of $R_3$ was chosen to be 1 k to give a corner frequency $f_Z$ of 3 kHz. The corner frequency $f_Z$ is very important since it determines the settling time of the converter. The settling time $T_S$ is given by:

$$T_s = \frac{1}{2\pi f_z}$$

A value of 3 kHz for $f_Z$ gives a settling time of about 50 μs, well within the specification of 100 μs.

Figure 7:
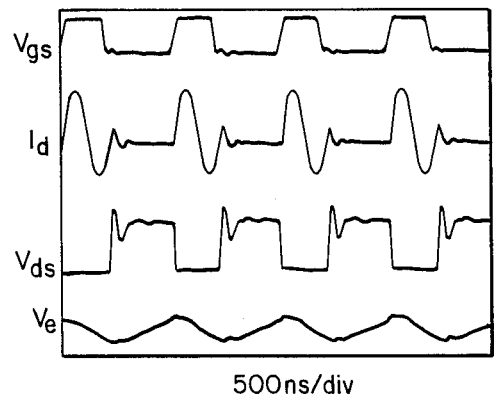
FIG. 7 is a graph showing circuit waveforms for the quasi-resonant converter of FIG. 6.

The circuit waveforms of the converter are shown in FIG. 7. The bottom waveform shows the very clean control signal which appears at the output of the operational amplifier.

With the embodiments already described, multi-loop control has been shown to be very effective for applications up to 1 MHz. Beyond this frequency, it is difficult to obtain a clean waveform at the output of the operational amplifier. Its limited bandwidth, limited slew rate and finite response time prevent the operational amplifier from effectively integrating the square-wave inductor voltage at frequencies above 1 MHz.

With continued reference to FIG. 6, since the multi-loop control regulates the switching frequency on a pulse-by-pulse basis, the response time of the comparator 132 and buffer driver 134 must be short compared to the on-time of the circuit. When using a comparator 140 such as that made by National Semiconductor under product number LM360 and a timer 142 bearing designation 74LS123, the delay from the input of the comparator to the output of the buffer driver 134 is improved. However, such a system cannot be used above 2 MHz.

Figure 8:
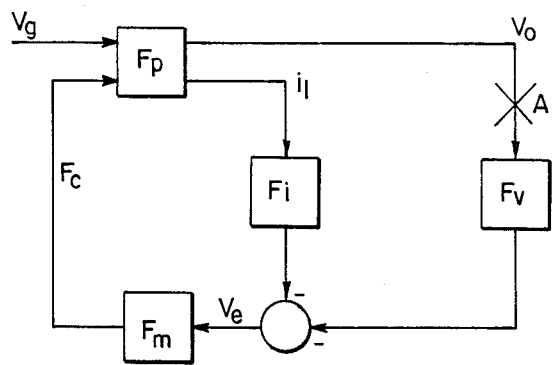
FIG. 8 is a schematic small signal block diagram of a multi-loop-controlled quasi-resonant converter.

An alternative to active integration of the inductor voltage has been found to apply this control at frequencies up to 10 MHz. The small signal block diagram of the multi-loop-controlled power stage is shown in FIG. 8. The gain block $F_P$ represents the power stage characteristics. The block $F_v$ is determined by the voltage compensation and $F_m$, the modulator gain, is determined by the size of control ramp used. $V_g$ is the gate voltage to the power switch and $V_O$ is the output voltage.

The current-sense gain is represented by $F_i$. For the circuit of FIG. 6, this gain is given as follows:

$$F_i = snL \cdot \frac{1}{sR_4C_1} = \frac{nL}{R_4C_1}$$

where n is the ratio of inductor sense turns to inductor power turns. The small signal gain of the current-sense feedback is, therefore, constant. In developing a circuit for higher frequencies, this constant gain must be maintained.

Figure 9:
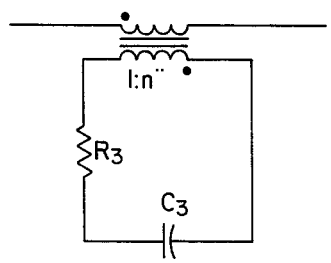
FIG. 9 is a schematic diagram of a passive RC network for high-frequency integration of filter-inductor voltage.

The passive RC network shown in FIG. 9 is used to integrate the high-frequency component of the inductor voltage. This network produces a clean ramp at frequencies beyond 20 MHz and provides a very simple and inexpensive solution to the problem. A second sensing winding must be used on the output filter-inductor to provide an isolated signal to the RC network.

The gain of this sensing network is given as follows:

$$F_i'' = \frac{sK''}{s+a}$$

where $$K'' = \frac{n''L}{C_3R_3}$$

and $$a'' = \frac{1}{C_3R_3}$$

The passive RC network does not give constant gain because a pole is introduced at the RC corner frequency. It does, however, integrate at high frequencies above this corner and can be used to provide high-frequency feedback which cannot be provided by an amplifier circuit.

Figure 10:
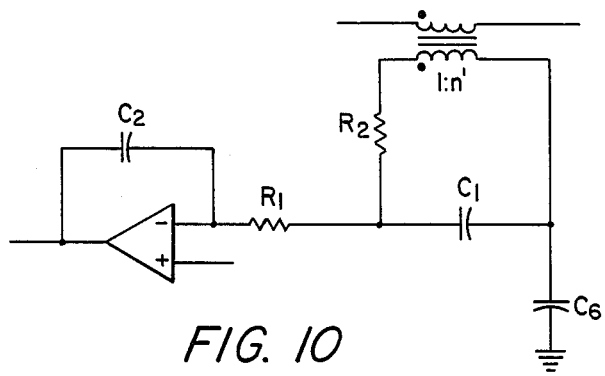
FIG. 10 is a schematic diagram showing an active operational amplifier network for low-frequency integration of filter-inductor voltage.

To regain the constant gain required for the current feedback, an amplifier network is used as before with the addition of an extra pole to roll-off the gain at high frequency. An operational amplifier network which provides low-frequency feedback of the inductor current is shown in FIG. 10.

The gain of this network is given as follows:

$$F_1' = \frac{K'}{s+a'}$$

where $$K' = \frac{n'L}{C_1C_2R_1R_2}$$

and $$a' = \frac{1}{C_2(R_1//R_2)}$$

Figure 11:
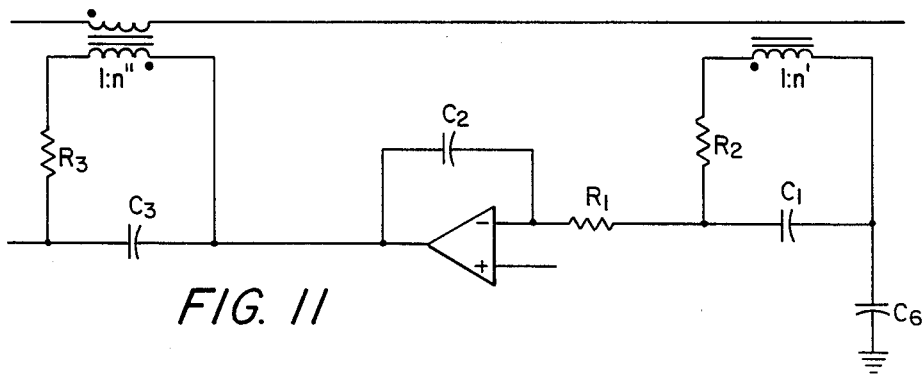
FIG. 11 is a schematic diagram showing a combined current sensing network for integration of filter-inductor voltage.
Figure 12:
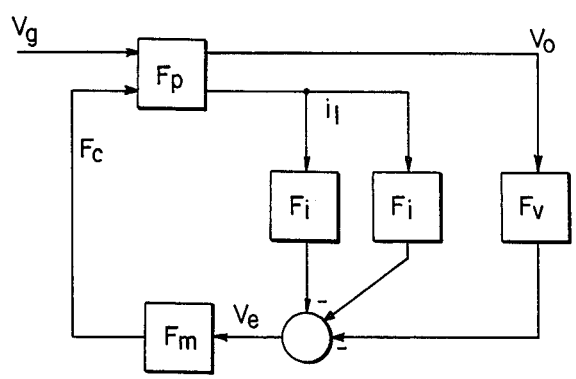
FIG. 12 is a schematic small signal block diagram of a multi-loop-controlled quasi-resonant converter with two-loop current sensing.

The combination of high- and low-frequency feedback of the inductor current is provided by the circuit of FIG. 11. The small signal block diagram of a converter with this current sensing scheme is shown in FIG. 12. Two current-feedback loops are used to give the same characteristics as the control system shown in FIG. 8. The gain $F_i = F_1'_i + F''_i$ can be made a constant for all frequencies if the components of the current sensing circuit are chosen correctly.

Figure 13:
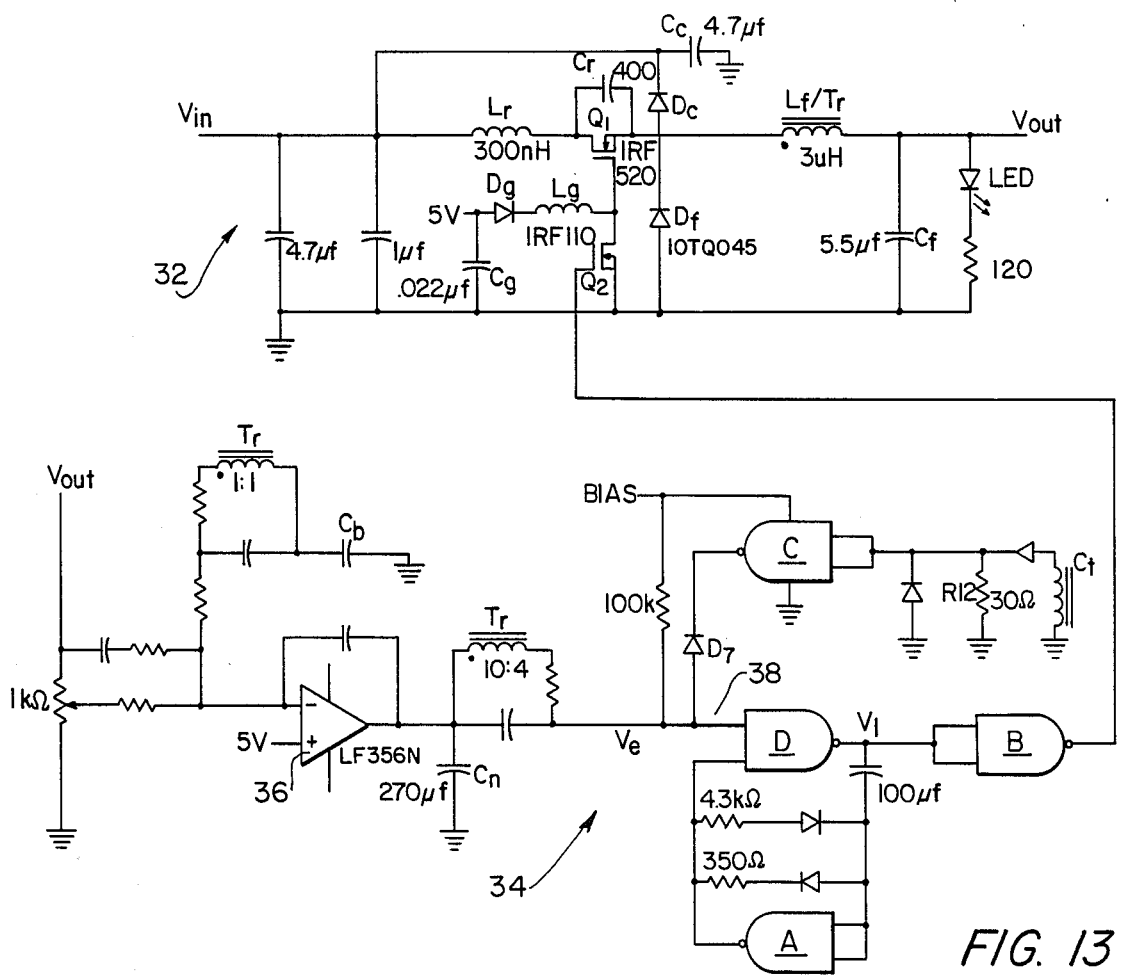
FIG. 13 is a schematic circuit diagram of a 7 MHz zero-voltage-switched buck quasi-resonant converter with two-loop current sensing control.

Another embodiment of the present invention is incorporated into a ZVS buck QRC as shown in FIG. 13. The converter operates from a 12 to 20 V input, delivering 7.5 V output at 25 W. The minimum switching frequency at low-line and full-load is 4 MHz. At high-line, light-load, the switching frequency is 7 MHz.

With reference to FIG. 13, the buck QRC is generally designated as 32, whereas the multi-loop control is designated as 34. The control circuit 34 basically comprises an operational amplifier 36 connected to four NAND gates A through D.

To reduce time delays in the control loop, fast CMOS NAND logic should be used for all control functions. Gate B drives $Q_2$ in the quasi-resonant gate drive. Gates A and D form an oscillator which provides constant off-time and a minimum switching frequency. When the voltage at input 38 of gate D is high, the oscillator drives the power circuit at minimum frequency (maximum on-time) allowing the output voltage to build up. During regulating operation, the voltage ramp generated by the high-frequency current feedback intersects the threshold voltage of the CMOS gate D, which turns off the power MOSFET $Q_1$. The total propagation delay from the threshold intersection to the fall of the current in the power switch is less than 20 ns, making this logic usable at switching frequencies up to 20 MHz. The on-time is controlled by the output of the error amplifier added to the ramp voltage.

The converter 32 is short-circuit protected by sensing the current of the resonant inductor $L_r$ with a current transformer CT. When the current exceeds a preselected value, the voltage across resistor $R_{12}$ exceeds the threshold voltage of the gate C which causes its output to switch low. This low signal overrides any other signals applied to the inputs of gate D, resulting in instantaneous turn-off of the power transistor $Q_1$. After the fixed off-time, $Q_1$ is turned on and, if the current is still too high, is turned off again by the protection circuit. When the load is too heavy, the converter operates in a current-limiting mode at a high switching frequency determined by the protection circuit. This enables the converter to recover immediately after the over-current condition is removed.

Figure 14:
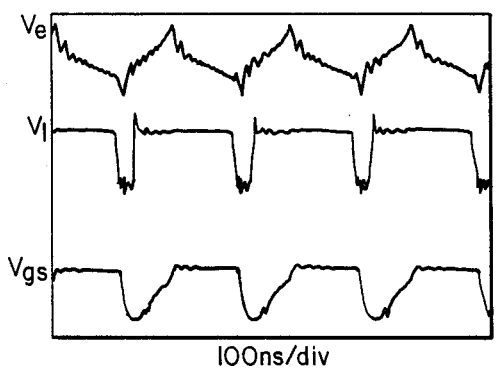
FIG. 14 is a graph showing circuit waveforms of the quasi-resonant converter of FIG. 13.

Control circuit waveforms are shown in FIG. 14. A clean control ramp at minimum and maximum frequency was obtained. The relationships between the control ramp and the switching of the power MOSFET clearly shows the fast switching speeds achieved with the logic circuit.

Loop gain measurements were performed to verify the effectiveness of the control circuit. Several loop gains are formed by the multi-loop control, but the only one that can be measured on the high-frequency circuit is that at Point A shown in FIG. 8. This loop gain shows the compensation-output transfer function with the current loops closed. The necessarily tight layout of the control-ramp circuit makes the current-loop gain impossible to measure with any conventional techniques.

Standard loop-gain measurement techniques were used. A Hewlett-Packard 4194A Impedance/Gain-Phase Analyzer was used to inject a sinusoidal disturbance into the loop and measure the input and output signals. Although standard measurement techniques were used, great care had to be taken to extend the measurement range up to 1 MHz. At high modulation frequencies, injected and return signals will couple through unshielded circuitry and cables and make measurements invalid.

Figure 15:
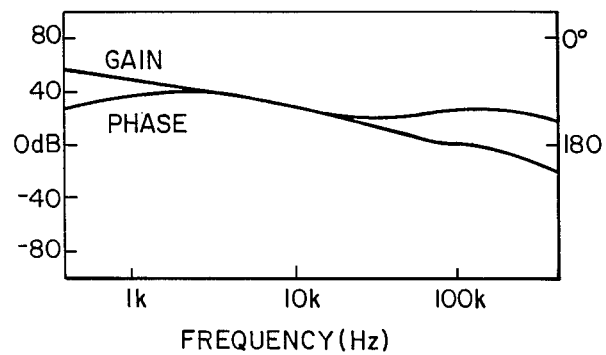
FIG. 15 is a graph showing the outer loop gain measurement for the quasi-resonant converter of FIG. 13.

The outer loop gain measurement for the converter is shown in FIG. 15. For this loop gain, the cross-over frequency was 100 kHz and the phase margin was 60.

The theoretical predictions and the measurements agree well at frequencies below 50 kHz. At higher frequencies, the circuit phase measurements showed additional delay. The reason for the discrepancy is the bandwidth limitation of the operational amplifier.

The phase of the loop gain remains well above −180° beyond 500 kHz. Theoretically, it should be possible to push the cross-over frequency up to 500 kHz without stability. However, as the gain required of the amplifier increases, further phase delay occurs due to the gain characteristics of the amplifier.

Figure 16:
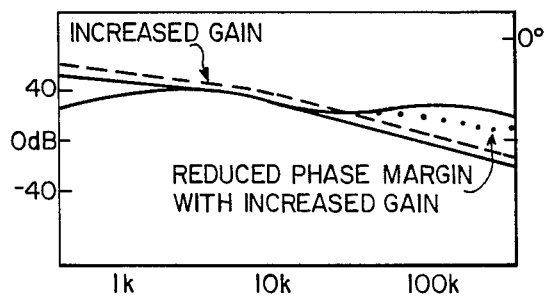
FIG. 16 is a graph showing the outer loop gain measurement for the quasi-resonant converter of FIG. 13 showing bandwidth limitations for the operational amplifier.

FIG. 16 shows the loop gain for the same circuit with decreased input impedance on the voltage feedback compensation. With an ideal amplifier, the phase would be identical to the previous measurement and the gain would be increased. The cross-over frequency was increased to 180 kHz, but the phase margin at that frequency decreased by 20°. With this compensation network, gain required at high frequencies is 20 dB. FIG. 15 shows the intersection of a flat 20 dB gain with the gain characteristics of the amplifier. The two lines intersect at about 300 kHz, producing an additional pole at this frequency.

Further increase in loop-gain cross-over can only be increased with an improved amplifier or by cascading the amplifier with a DC gain stage having high bandwidth. With these techniques, it is feasible to push the loop gain cross-over close to 1 MHz.

From the above, it is apparent that many modifications and variations of the present invention are possible in light of the above teachings. It is therefore to be understood that, within the scope of the appended claims, the invention may be practiced otherwise than as specifically described.

What is claimed is:

1. A multi-loop controller/for controlling a quasi-resonant converter having a power switch, a filter inductor and an output voltage, said controller comprising:
   means for sensing the output voltage of said converter;
   means for detecting the filter inductor current;
   referencing means for comparing said output voltage with a known reference voltage to develop a control error voltage when said output voltage exceeds said reference voltage;
   comparing means for comparing said inductor current with the output of said referencing means and producing a control signal when a predetermination relationship has been detected; and
   activating means responsive to said control signal for turning the power switch on.

2. The controller of claim 1, wherein said predetermined relationship is the intersection of the down-slope of said inductor-current and said control error voltage.

3. The controller of claim 1, wherein said activating means comprises:
   a buffer driver means for converting said control signal produced by said comparing means into a constant on-time pulse; and
   switching means responsive to said buffer driver means for closing said power switch.

4. The controller of claim 1, wherein said detecting means comprises means for directly detecting the filter inductor current through said filter inductor.

5. The controller of claim 1, wherein said detecting means comprises transformer means having a primary winding in series with a circuit element other than said filter inductor, said inductor current passing through said circuit element, and a secondary winding in circuit with an input of said comparing means.

* * * * *